US012773743B2

(12) United States Patent
Ishizawa et al.

(10) Patent No.: US 12,773,743 B2

(45) Date of Patent: Oct. 27, 2026

(54) MULTILAYER GRINDSTONE FOR GEAR GRINDING

(71) Applicants: NORITAKE CO., LIMITED, Nagoya (JP); NORITAKE COATED ABRASIVE CO., LTD., Nagoya (JP)

(72) Inventors: Takamasa Ishizawa, Nagoya (JP); Yusuke Oura, Nagoya (JP); Yuji Fujita, Nagoya (JP); Koshi Hashimoto, Miyoshi (JP)

(73) Assignees: NORITAKE CO., LIMITED, Nagoya (JP); NORITAKE COATED ABRASIVE CO., LTD., Nagoya (JP)

( * ) Notice: Subject to any disclaimer, the term of this patent is extended or adjusted under 35 U.S.C. 154(b) by 540 days.

(21) Appl. No.: 17/639,275

(22) PCT Filed: Jul. 17, 2020

(86) PCT No.: PCT/JP2020/027963

§ 371 (c)(1),
(2) Date: Feb. 28, 2022

(87) PCT Pub. No.: WO2021/039196

PCT Pub. Date: Mar. 4, 2021

(65) Prior Publication Data

US 2022/0331892 A1 Oct. 20, 2022

(30) Foreign Application Priority Data

Aug. 29, 2019 (JP) ................................ 2019-157444

(51) Int. Cl.
*B23F 21/02* (2006.01)
*B23F 5/04* (2006.01)
(Continued)

(52) U.S. Cl.
CPC .............. *B23F 21/026* (2013.01); *B23F 5/04* (2013.01); *B24D 3/28* (2013.01); *B24D 5/14* (2013.01)

(58) Field of Classification Search
CPC ................................... B24D 5/16; B24D 5/06
(Continued)

(56) References Cited

U.S. PATENT DOCUMENTS 1,343,276 A 6/1920 Olson et al.
2,115,209 A * 4/1938 Mulholland ........... B24D 13/02 451/490
(Continued)

FOREIGN PATENT DOCUMENTS

JP S49-09883 U1 8/1974
JP S49-098883 U1 8/1974
(Continued)

OTHER PUBLICATIONS

"Machining Application Handbook," 1st edition, Aug. 31, 1983, p. 842.
(Continued)

*Primary Examiner* — Brian D Keller
*Assistant Examiner* — Jason Khalil Hawkins
(74) *Attorney, Agent, or Firm* — Oliff PLC

(57) ABSTRACT

A gear-grinding multilayer grindstone includes a rough machining portion and a finish machining portion that are disposed adjacent to each other on a rotational axis. The rough machining portion includes a first core and a rough machining grindstone that is held on the first core. The finish machining portion includes a second core that is adjacent to the first core, and a finish machining grindstone that is held on the second core. The first core and the second core are fixed to each other, without the rough machining grindstone
(Continued)

and the finish machining grindstone being fixed at least at outer peripheral portions thereof to each other.

8 Claims, 7 Drawing Sheets

(51) Int. Cl.
*B24D 3/28* (2006.01)
*B24D 5/14* (2006.01)

(58) Field of Classification Search
USPC .......................................................... 451/544
See application file for complete search history.

(56) References Cited

U.S. PATENT DOCUMENTS 3,462,887 A * 8/1969 Hackman, Jr. ........ B24B 33/085 451/547
6,257,963 B1 * 7/2001 Thyssen ................ B24B 53/075 451/900
6,386,948 B1 * 5/2002 Kondo .................... B24B 27/06 451/28
2002/0021404 A1 * 2/2002 Nauche ..................... B24B 9/14 351/42
2003/0003853 A1 1/2003 Stocker
2008/0299884 A1 12/2008 Moroto et al.
2013/0137343 A1 * 5/2013 Sato .......................... B24B 1/00 451/28
2014/0141699 A1 * 5/2014 Yanase .................. B23F 21/026 451/547
2014/0323020 A1 * 10/2014 Kaul ...................... B24D 5/066 451/541
2016/0059332 A1 3/2016 Nuriya et al.
2016/0107291 A1 4/2016 Ozaki et al.
2017/0197263 A1 7/2017 Yanase et al.
2019/0375073 A1 * 12/2019 Martin ..................... B24D 5/02

FOREIGN PATENT DOCUMENTS

JP S50-027636 B1 9/1975
JP S60-138615 U1 9/1985
JP S62-074526 A 4/1987
JP H08-276365 A 10/1996
JP 2003-326467 A 11/2003
JP 2008-110461 A 5/2008
JP 2010-105126 A 5/2010
JP 2012-152882 A 8/2012
JP 2013-018089 A 1/2013
JP 2015-016522 A 1/2015
JP 2019-119040 A 7/2019

OTHER PUBLICATIONS

Apr. 14, 2023 Office Action issued in Chinese Patent Application No. 202080060968.7.
May 17, 2022 Office Action issued in Japanese Patent Application No. 2019-157444.
Nov. 15, 2022 Office Action issued in Japanese Patent Application No. 2019-157444.
Sep. 24, 2020 International Search Report issued in International Patent Application No. PCT/JP2020/027963.
Sep. 24, 2020 Written Opinion ssued in International Patent Application No. PCT/JP2020/027963.
"Machining Application Handbook," 1st edition, Aug. 31, 1989, p. 842.
Feb. 14, 2025 Office Action issued in Korean Patent Application No. 10-2022-7010312.
Oct. 30, 2023 extended Search Report issued in European Patent Application No. 20859107.3.

* cited by examiner

MULTILAYER GRINDSTONE FOR GEAR GRINDING

TECHNICAL FIELD

The present invention relates to a multilayer grindstone for gear grinding, which is capable of grinding a gear at a high speed.

BACKGROUND ART

In a transmission for a vehicle and a speed reducer for an industrial robot, for example, many gears are used. These gears, particularly, helical gears, are required to have improved performances such as reduction of vibration and noise, improvement of transmission efficiency and extension of service life, for example, with demands for more silent vehicles and improved fuel economy of vehicles in recent years. Further, the gears are required to be machined for a shorter length of time in an actual gear machining operation, in addition to the above-described improved performances.

On the other hand, there has been proposed a multilayer grindstone for gear grinding, which is constituted integrally by a rough machining portion and a finish machining portion that are fixed to each other on a rotational axis. Such a multilayer grindstone for gear grinding is used, for example, in a continuous-generation gear grinding machine. The rough machining portion and the finish machining portion, which constitute the multilayer grindstone, are different from each other in terms of kind and grain size of abrasive grains, kind and binding degree of a binder, and porosity. Thus, the rough machining portion and the finish machining portion are different in physical characteristics, so as to enable the multilayer grindstone to perform a machining operation at a high speed while maintaining a high performance in the machining operation.

PRIOR ART DOCUMENT

Patent Document

Patent Document 1: JP2013-18089A.

SUMMARY OF THE INVENTION

Object to be Achieved by the Invention

By the way, in the above-described conventional multilayer grindstone for gear grinding, the rough machining portion and the finish machining portion are fixed at their entire end surfaces to each other, so as to be fixed to each other and rotatable about a rotational axis that is common to the rough machining portion and the finish machining portion. In this arrangement, when the conventional multilayer grindstone is rotated about the rotational axis in a grinding operation, there could be difference between the rough machining portion and the finish machining portion in expansion, wherein the difference could be caused due to the difference of elastic modulus or other physical characteristics. The difference in the expansion makes an upper limit of a peripheral speed such as a fracture peripheral speed in a grinding operation, to be lower than in a case in which each of the rough machining portion and the finish machining portion is used as a single unit, so that there is a problem that satisfactory grinding speed or satisfactory grinding efficiency cannot be obtained in the conventional multilayer grindstone. For example, where the finish machining portion has a higher elasticity than the rough machining portion so as to be displaced larger than the rough machining portion during rotation of the finish machining portion, there is a problem that a rough machining portion, which is affected by displacement of the finish machining portion, could be broken at a lower peripheral speed than in the above-described case in which each of the rough machining portion and the finish machining portion is used as the single unit. Therefore, there is no choice but to perform the grinding operation at a lower rotational speed of the grindstone than in the above-described case, so that there is a limitation to the machining efficiency of the gear grinding because a machining time required for the gear grinding, which is a machining operation performed by meshing of the grindstone with a gear, is largely dependent on the rotational speed of the grindstone. Further, where the rough machining portion and the finish machining portion as the respective single units are mounted on a spindle so as to be coaxial with each other by using a flange, it is difficult to provide a thread groove in each of outer circumferential machining surfaces of the respective rough and finish machining portions that are contiguous to each other in a direction of the rotational axis, such that the thread grooves provided in the respective outer circumferential machining surfaces of the rough and finish machining portions are made exactly coincident in phase with each other. Therefore, for example, an initial dressing operation requires a longer length of time than normal, thereby problematically increasing a machining time.

The present invention was made in view of the background discussed above. It is therefore an object of the present invention to provide a multilayer grindstone for gear grinding, which is capable of performing a gear grinding operation with satisfactory grinding speed or satisfactory grinding efficiency, without reducing a fracture peripheral speed, i.e., an upper limit of a peripheral speed in the grinding operation.

Various studies made by inventors of the present invention and their collaborators under the above-described situation have revealed that, where the finish machining portion and the rough machining portion are fixed to each other, by fixing end surfaces of respective first and second cores of the finish machining portion and the rough machining portion to each other, without bonding an end surface of a finish machining grindstone of the machining portion and an end surface of a rough machining grindstone of the rough finish machining portion to each other, it is possible to obtain substantially the same level of breaking strength as in the case in which each of the rough machining portion and the finish machining portion is used as a single unit. The present invention was made based on such a finding.

Measures for Solving the Problem

That is, the gist of the present invention is that, in a multilayer grindstone for gear grinding, which includes a rough machining portion and a finish machining portion that are disposed adjacent to each other on a rotational axis, the rough machining portion includes a first core and a rough machining grindstone that is held on the first core, the finish machining portion includes a second core that is adjacent to the first core, and a finish machining grindstone that is held on the second core, and the first core and the second core are fixed to each other, without the rough machining grindstone and the finish machining grindstone being fixed at least at outer peripheral portions thereof to each other.

Effects of the Invention

According to the gear-grinding multilayer grindstone of the present invention, the rough machining portion and the finish machining portion are integral with each other, with the first and second cores being fixed to each other, without the rough machining grindstone and the finish machining grindstone being fixed at least at outer peripheral portions thereof to each other. Owing to this feature, it is possible to obtain substantially the same level of breaking strength as in the case in which each of the rough machining portion and the finish machining portion is used as a single unit, and to perform a grinding operation with substantially the same rotational speed as in the case in which each of the rough and finish machining portions is used as the single unit, thereby increasing the machining efficiency of gear grinding. Further, end surfaces of the respective first and second cores are fixed to each other, so that, where a thread groove is provided in each of an outer circumferential surface of the rough machining grindstone of the rough machining portion and an outer circumferential surface of the finish machining grindstone of the finish machining portion, the thread grooves provided in the respective outer circumferential surfaces of the rough and finish machining grindstones can be made coincident in phase with each other, thereby making it possible to reduce a time required for the dressing operation and to further increase the grinding efficiency.

Preferably, the rough machining grindstone is a vitrified grindstone in which abrasive grains are fixed to each other through an inorganic binder, and the finish machining grindstone is a resinoid grindstone in which abrasive grains are fixed to each other through a resin binder. Owing to this feature, the finish machining grindstone of the finish machining portion has a higher elasticity than the rough machining grindstone of the rough machining portion.

Further, preferably, the rough machining grindstone is a vitrified grindstone in which abrasive grains are fixed to each other through an inorganic binder, and the finish machining grindstone is an abrasive-cloth laminated grindstone including abrasive cloths in each of which abrasive grains are fixed in a plane, such that the abrasive cloths are laminated on each other and are fixed to each other through a resin. Owing to this feature, a centrifugal force generated during rotation is low owing to a low specific gravity of the finish machining grindstone, so that the gear-grinding multilayer grindstone can be used with a higher peripheral speed than where the abrasive-cloth laminated grindstone is used as the single unit.

Further, preferably, each of the first core and the second core is constituted by a vitrified grindstone that has a higher strength than the rough machining grindstone. Owing to this feature, the first and second cores can be easily produced.

Further, preferably, each of the first core and the second core is constituted by the vitrified grindstone that is reinforced with an impregnated resin being cured. Owing to this feature, the gear-grinding multilayer grindstone has an increased durability.

Further, preferably, the rough machining portion and the finish machining portion are fixed to each other, with only the first core and the second core being bonded at end surfaces thereof to each other. Owing to this feature, even if each one of the rough machining grindstone and the finish machining grindstone is deformed, the other of the rough machining grindstone and the finish machining grindstone is not affected by the deformed one, so that the peripheral speed can be increased in the grinding operation, with a grinding performance of each of the rough machining grindstone and the finish machining grindstone being maintained, whereby a grinding efficiency is increased. Further, since a phase deviation between the rough machining grindstone and the finish machining grindstone can be eliminated, a dressing operation can be performed on the outer circumferential surfaces of the rough machining grindstone and the finish machining grindstone in a short length of time as a standard dressing operation.

Further, preferably, the gear-grinding multilayer grindstone is to be used in a continuous-generation gear grinding operation that is executed to form teeth in an outer circumferential surface of a gear blank, by displacing the gear-grinding multilayer grindstone in a direction of the rotational axis while rotating the gear-grinding multilayer grindstone about the rotational axis, and performing reciprocating grinding feed of the gear-grinding multilayer grindstone in a direction parallel to a rotational axis of the gear blank while sequentially rotating the gear blank about the rotational axis of the gear blank, such that rotation of the gear blank is synchronized with the reciprocating grinding feed of the gear-grinding multilayer grindstone. Owing to this feature, the gear blank is ground, with contact of the gear blank at its large arc length with the gear-grinding multilayer grindstone, and with constant change of position in which the abrasive grains are in contact with the gear blank, so that the gear grinding is performed with a high efficiency.

Further, preferably, the rough machining grindstone is a vitrified grindstone in which abrasive grains are fixed to each other through an inorganic binder, and the first core has a vitrified grindstone structure that is a structure same as the vitrified grindstone, and is constituted integrally with the vitrified grindstone, on an inner peripheral side of the vitrified grindstone. Owing to this feature, the first core has the vitrified grindstone structure that is the structure same as the vitrified grindstone, and is constituted integrally with the vitrified grindstone, on the inner peripheral side of the vitrified grindstone, so that it is not necessary to fix the vitrified grindstone onto an outer circumferential surface of the first core, and accordingly the manufacturing process is simplified.

Further, preferably, the rough machining grindstone is a vitrified grindstone in which abrasive grains are fixed to each other through an inorganic binder, wherein the first core has a vitrified grindstone structure that is a structure same as the vitrified grindstone, and is constituted integrally with the vitrified grindstone, on an inner peripheral side of the vitrified grindstone, wherein the second core has the vitrified grindstone structure that is the structure same as the vitrified grindstone, and is constituted integrally with the first core, on a side of the first core which is close to the finish machining grindstone, and wherein the finish machining grindstone is fixed on an outer circumferential surface of the second core. Owing to this feature, the first core has the vitrified grindstone structure that is the structure same as the vitrified grindstone and is constituted integrally with the vitrified grindstone, on the inner peripheral side of the vitrified grindstone, and the second core is constituted integrally with the first core, so that it is not necessary to fix the vitrified grindstone onto an outer circumferential surface of the first core and to fix the first and second cores to each other, and accordingly the manufacturing process is simplified.

MODES FOR CARRYING OUT THE INVENTION

Hereinafter, there will be described embodiments of the present invention, in detail with reference to the drawings.

Embodiment 1

Figure 1:
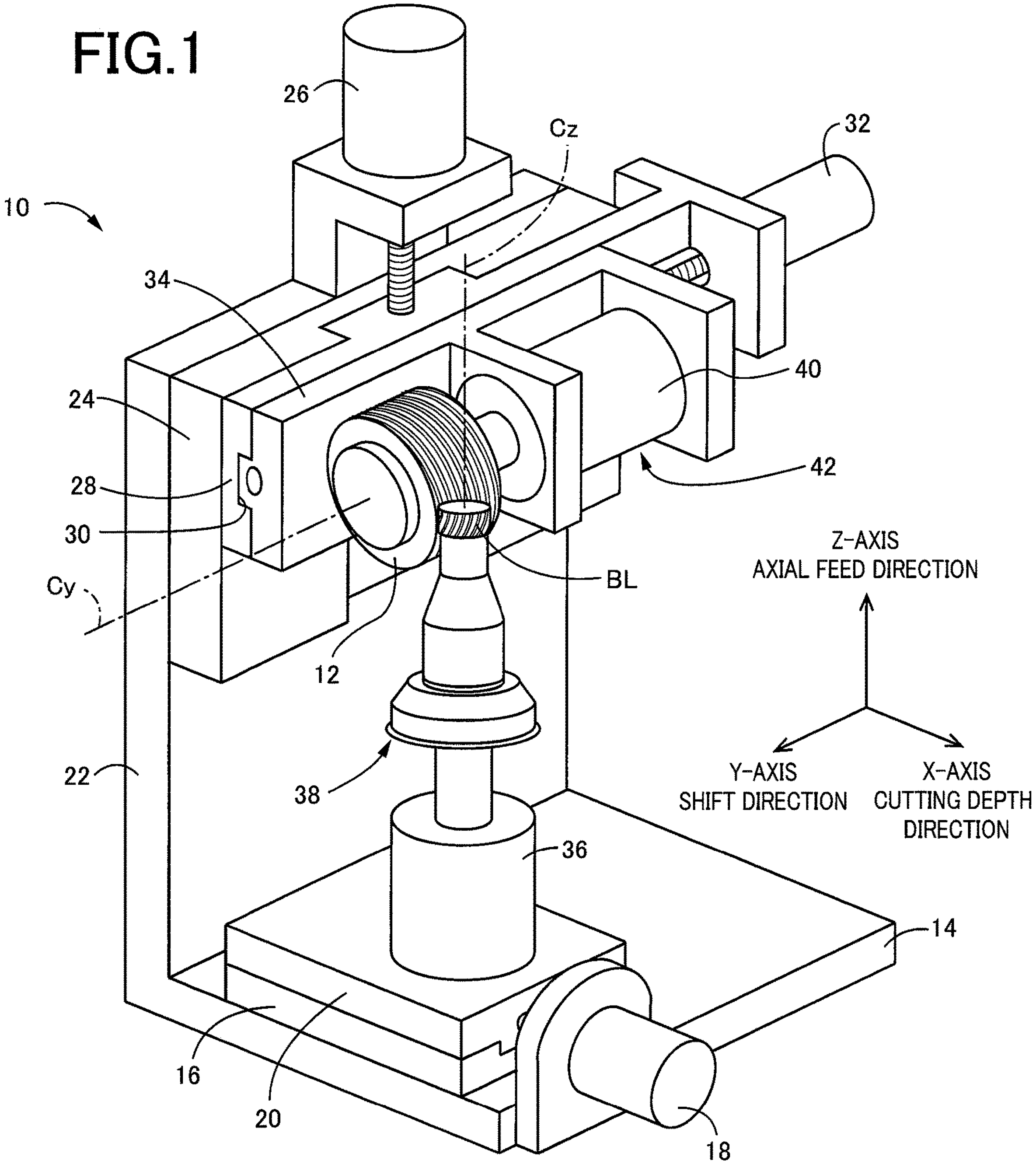
FIG. 1 A perspective view for explaining constructions of major portions of a continuous-generation gear grinding machine in an embodiment of the present invention.
Figure 2:
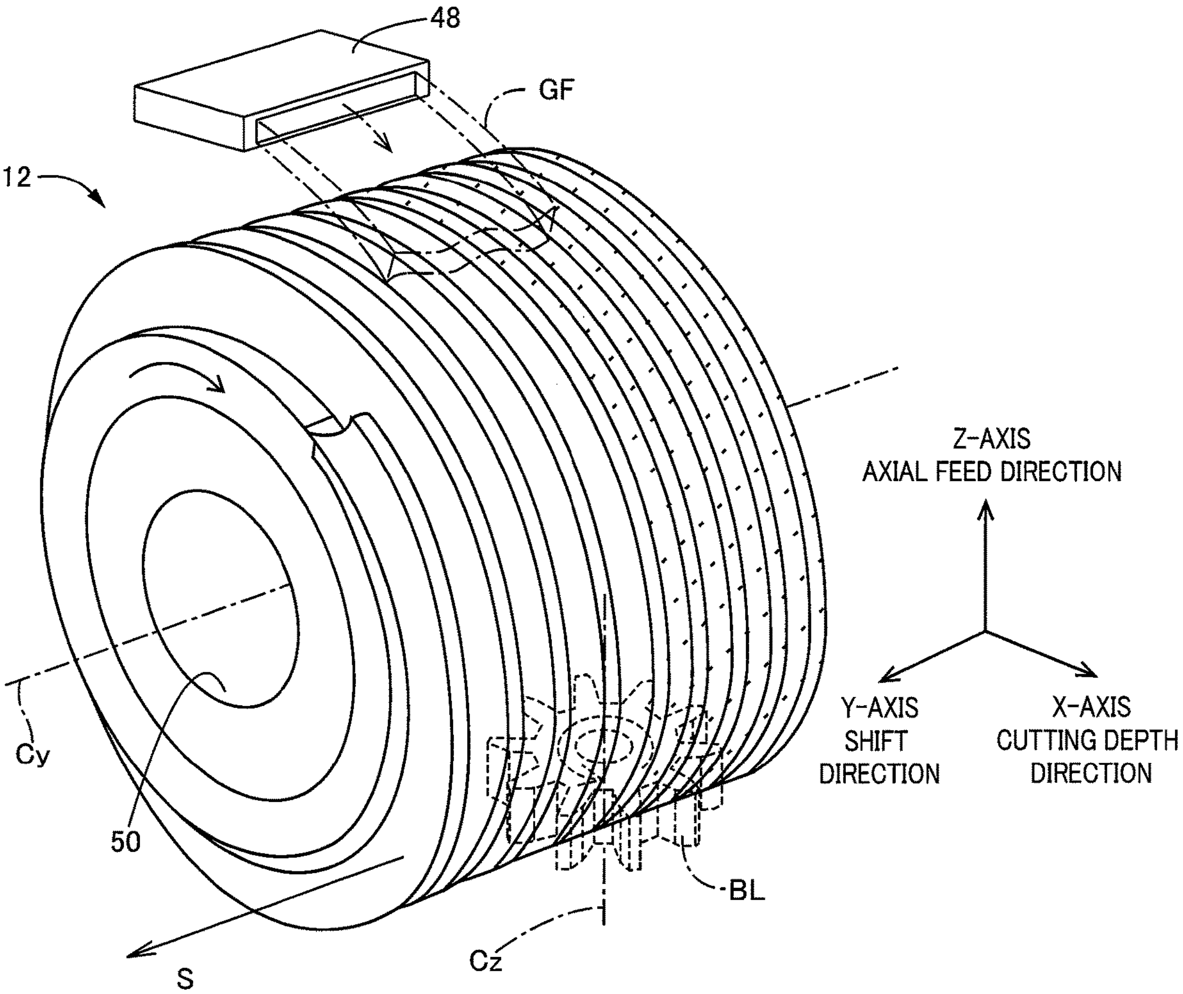
FIG. 2 A perspective view for explaining a continuous-generation gear grinding operation performed on a gear blank by a gear-grinding multilayer grindstone in the continuous-generation gear grinding machine of FIG. 1.

FIG. 1 is a perspective view for explaining constructions of major portions of a continuous-generation gear grinding machine 10 in an embodiment of the present invention. FIG. 2 is a perspective view for explaining a continuous-generation gear grinding operation performed on a gear blank BL by a gear-grinding multilayer grindstone 12 in the continuous-generation gear grinding machine 10 of FIG. 1. In the continuous-generation gear grinding machine 10, the continuous-generation gear grinding operation, which is referred to as so-called shift grinding, is performed on an outer circumferential surface of the gear blank BL, by using the thread-shaped gear-grinding multilayer grindstone 12 and a grinding fluid GF. The continuous-generation gear grinding machine 10 is constructed, for example, such that the gear-grinding multilayer grindstone 12 is rotatable about a rotational axis Cy that is parallel to a Y-axis extending in a horizontal direction, and is movable relative to the gear blank BL, in a shift direction S, i.e., a direction of the rotational axis Cy parallel to the Y-axis, in an axial feed direction parallel to a Z-axis direction that is orthogonal to the Y-axis, and in a cutting depth direction parallel to an X-axis direction that is orthogonal to the Y-axis and Z-axis. The gear-grinding multilayer grindstone 12 has a thread shape, with a helically-extending groove being provided in its outer circumferential grinding surface. Further, the continuous-generation gear grinding machine 10 holds the gear blank BL such that the gear blank BL is rotatable about a rotational axis Cz that is parallel to the Z axis.

Specifically, the continuous-generation gear grinding machine 10 includes an X-axis table 20, a Z-axis table 28, a Y-axis table 34, a work rotation drive device 38 and a grindstone rotation drive device 42. The X-axis table 20 is guided in the X-axis direction by an X-axis-direction guide member 16 that is fixed on a base 14, and is to be positioned in the X-axis direction by an X-axis-direction positioning motor 18. The Z-axis table 28 is guided in the Z-axis direction by a Z-axis-direction guide member 24 that is fixed to a support wall 22 vertically extending from the base 14, and is to be positioned in the Z-axis direction by a Z-axis-direction positioning motor 26. The Y-axis table 34 is guided in the Y-axis direction by a Y-axis-direction guide groove 30 that is provided in the Z-axis table 28, and is to be positioned in the Y-axis direction by a Y-axis-direction positioning motor 32. The work rotation drive device 38 is fixedly disposed on the X-axis table 20, and is configured to rotatably hold the gear blank BL. The work rotation drive device 38 includes a work driving motor 36 configured to drive and rotate the gear blank BL about the rotational axis Cz. The grindstone rotation drive device 42 is fixedly disposed on the Y-axis table 34, and is configured to rotatably hold the gear-grinding multilayer grindstone 12. The grindstone rotation drive device 42 includes a grindstone driving motor 40 configured to drive and rotate the gear-grinding multilayer grindstone 12 about the rotational axis Cy.

The continuous-generation gear grinding machine 10 is configured to drive the X-axis table 20, Z-axis table 28 and Y-axis table 34 by the X-axis-direction positioning motor 18, Z-axis-direction positioning motor 26 and Y-axis positioning motor 32, in accordance with a pre-stored program, so as to feed the gear-grinding multilayer grindstone 12 in the direction of the rotational axis Cy, i.e., the shift direction S, while rotating the gear-grinding multilayer grindstone 12 about the rotational axis Cy, and performing reciprocating grinding feed of the gear-grinding multilayer grindstone 12 with a predetermine grinding stroke in an axial direction, i.e., the Z-axis direction parallel to the rotational axis Cz of the gear blank BL as a workpiece while sequentially rotating the gear blank BL about the rotational axis Cz of the gear blank BL, such that rotation of the gear blank BL is synchronized with the reciprocating grinding feed of the gear-grinding multilayer grindstone 12. Further, with presence of the grinding fluid GF supplied widely from a coolant nozzle 48, helical teeth or straight teeth on the outer circumferential surface of the gear blank BL are ground by a constantly new grinding surface and constantly new abrasive grains of the gear-grinding multilayer grindstone 12, so that the continuous-generation gear grinding operation is performed on the outer circumferential surface of the gear blank BL, with a stable accuracy and a high machining accuracy, and with suppressed wear of the abrasive grains of the gear-grinding multilayer grindstone 12.

Figure 3:
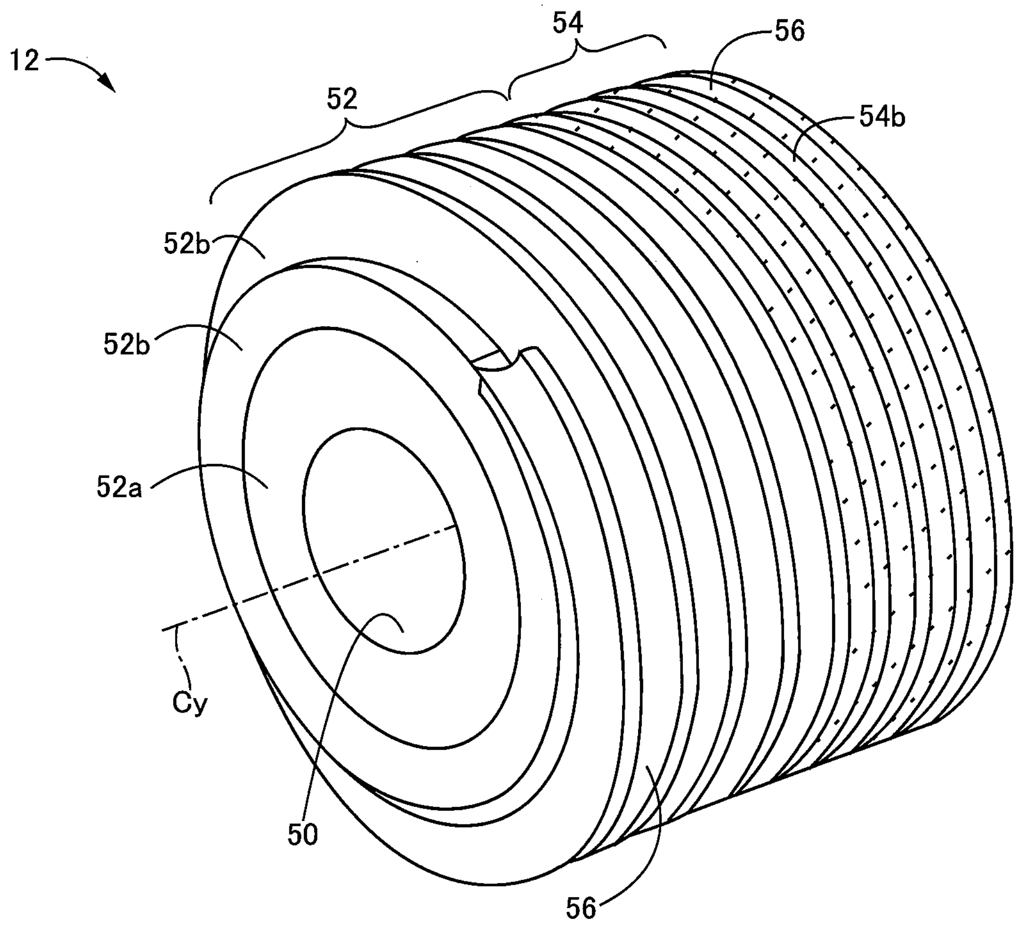
FIG. 3 A perspective view for explaining the gear-grinding multilayer grindstone shown in FIG. 2, by showing the multilayer grindstone in enlargement.

FIG. 3 is a perspective view for explaining the gear-grinding multilayer grindstone 12, by showing the multi-layer grindstone 12 in enlargement. As shown in FIG. 3, the gear-grinding multilayer grindstone 12 has a mount hole 50 passing therethrough in the direction of the rotational axis Cy, and is integrally constituted by a rough machining portion 52 and a finish machining portion 54 that are disposed adjacent to each other on the rotational axis Cy. A thread groove 56 is formed in each of outer circumferential grinding surfaces of the respective rough and finish machining portions 52, 54, such that the thread grooves 56 formed in the respective outer circumferential grinding surfaces of the rough and finish machining portions 52, 54 are made accurately coincident in phase with each other, so as to cooperate with each other to constitute a single thread groove that extends continuously over the rough and finish machining portions 52, 54.

Figure 4:
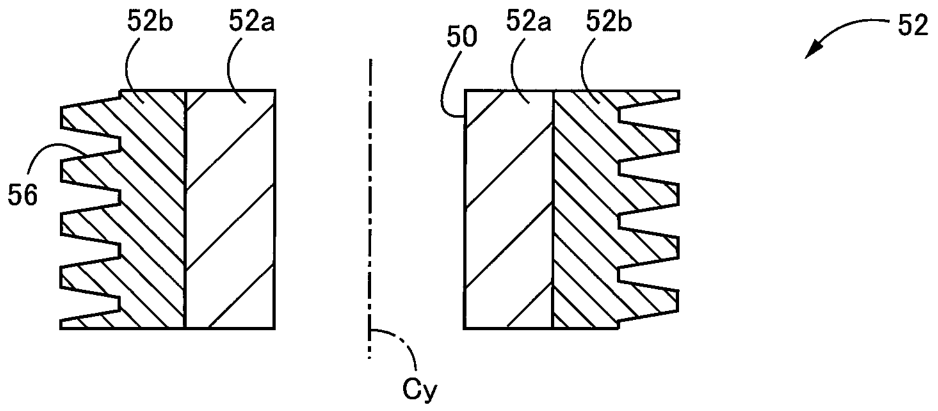
FIG. 4 A cross sectional view for explaining construction of a rough machining portion of the gear-grinding multilayer grindstone shown in FIG. 2.
Figure 5:
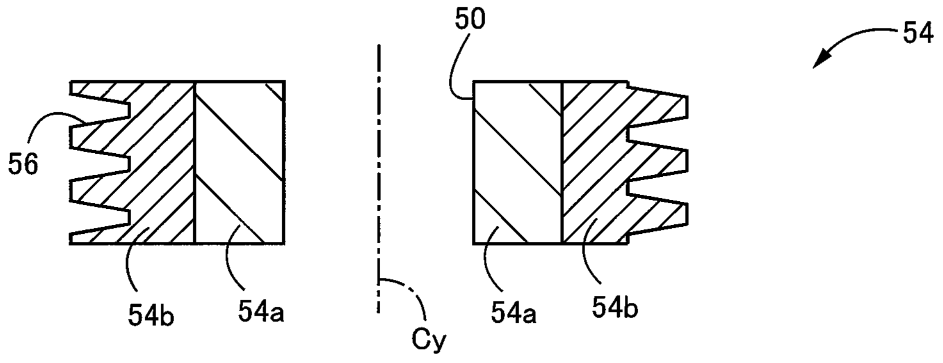
FIG. 5 A cross sectional view for explaining construction of a finish machining portion of the gear-grinding multilayer grindstone shown in FIG. 2.
Figure 6:
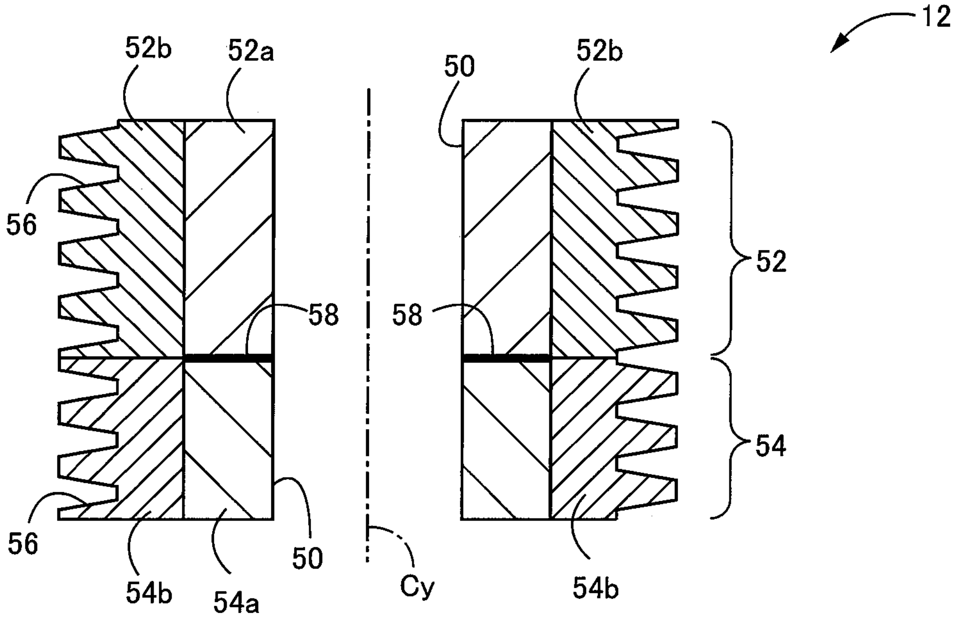
FIG. 6 A cross sectional view for explaining construction of the gear-grinding multilayer grindstone shown in FIG. 2.

FIG. 4 is a cross sectional view for explaining construction of the rough machining portion 52 of the gear-grinding multilayer grindstone 12. FIG. 5 is a cross sectional view for explaining construction of the finish machining portion 54 of the gear-grinding multilayer grindstone 12. FIG. 6 is a cross sectional view for explaining construction of the gear-grinding multilayer grindstone 12. As shown in FIG. 4, the rough machining portion 52 includes a cylindrical-shaped first core 52*a* having the mounting hole 50 and a rough machining grindstone 52*b* held on the first core 52*a*. The rough machining grindstone 52*b* is held on the first core 52*a*, with the rough machining grindstone 52*b* is fixed onto an outer circumferential surface of the first core 52*a*, for example, through adhesive. As shown in FIG. 5, the finish machining portion 54 includes a cylindrical-shaped second core 54*a* having the mounting hole 50 and a finish machining grindstone 54*b* held on the second core 54*a*. The finish machining grindstone 54*b* is held on the second core 54*a*, with the finish machining grindstone 54*b* is fixed onto an outer circumferential surface of the second core 54*a*, for example, through adhesive.

As shown in FIG. 6, the gear-grinding multilayer grindstone 12 is integrally constituted such that the first and second cores 52*a*, 54*a*, which are adjacent to each other, are fixed at their end surfaces to each other with use of adhesive 58, without the rough machining grindstone 52*b* and the finish machining grindstone 54*b* being fixed to each other, or without the rough and finish machining grindstones 52*b*, 54*b* being fixed at least at their outer peripheral portions to each other. In FIG. 6, the adhesive 58 is represented by thick lines, for easier understanding.

The rough machining grindstone 52*b* and the finish machining grindstone 54*b* are different from each other in terms of kind and grain size of abrasive grains, kind and binding degree of a binder, and porosity, for example. Thus, the rough and finish machining grindstones 52*b*, 54*b* are different in physical characteristics, so as to enable the gear-grinding multilayer grindstone 12 to perform a machining operation at a high speed while maintaining at a high performance in both of a rough machining operation and a finish machining operation. The rough and finish machining grindstones 52*b*, 54*b* are not basically fixed to each other.

The rough machining grindstone 52*b* has a higher strength than the finish machining grindstone 54*b*, and is constituted by, for example, a vitrified grindstone in which abrasive grains are fixed to each other through a vitreous inorganic binder (vitrified bond). The finish machining grindstone 54*b* has a higher elasticity, namely, a lower elastic modulus than the rough machining grindstone 52*b*, and is constituted by, for example, a resinoid grindstone in which abrasive grains are fixed to each other through a resin binder (resinoid bond) made of thermosetting resin, or an abrasive-cloth laminated grindstone including abrasive cloths which are laminated on each other, for example, in the direction of rotational axis Cy and which are fixed to each other through a resin, wherein, in each of the abrasive cloths, adhesive (in which abrasive grains and synthetic resin are mixed) is applied in a plain onto a synthetic or natural fibrous non-woven fabric or woven fabric.

The first core 52*a* and the second core 54*a* may be made of respective different materials such as metal material, resin material and inorganic-material sintered body. However, it is preferable that the first and second cores 52*a*, 54*a* are constituted by respective vitrified grindstones which are substantially the same as each other and which have a higher strength than the rough machining grindstone 52*b*, so that the first and second cores can be produced easily. Each of the first and second cores 52*a*, 54*a* is constituted by the vitrified grindstone reinforced with a resin which is impregnated and then cured. The outer circumferential surface of each of the first and second cores 52*a*, 54*a* is tapered at 1° to 5°, as needed.

Hereinafter, there will be described fracture peripheral-speed tests conducted by the present inventors and results of the tests. Table 1 shows materials 1-5 for grindstone samples that were used in the fracture peripheral-speed tests. In Table 1, "Elastic Modulus" indicates a relative value for each of the materials 1-5, where the elastic modulus of the vitrified grindstone is 100.

TABLE 1

| | Use | Grindstone or Adhesive | Elastic Modulus (relative value) |
|---|---|---|---|
| Material 1 | Rough Machining | Vitrified Grindstone | 100 |
| Material 2 | Finish Machining | Resinoid Grindstone | 31 |
| Material 3 | Finish Machining | Abrasive-Cloth Laminate | 1.5 |
| Material 4 | Core | Resin-Impregnated Vitrified Grindstone | 197 |
| Material 5 | Adhesive | Epoxy Resin Adhesive | 156 |

(Fracture Peripheral-Speed Test 1)

The fracture peripheral-speed test was conducted in accordance with regulation of JISR6240, for the material 1 in the form of a core-less rough machining vitrified grindstone of a single unit, the material 2 in the form of a core-less finish machining resinoid grindstone of a single unit, and a core-less gear-grinding multilayer grindstone including the core-less rough machining vitrified grindstone of the single unit and the core-less finish machining resinoid grindstone of the single unit, which are fixed at their entire end surfaces (i.e., opposed surfaces opposed to each other in the direction of the rotational axis Cy) to each other with use of adhesive of the material 5.

Figure 7:
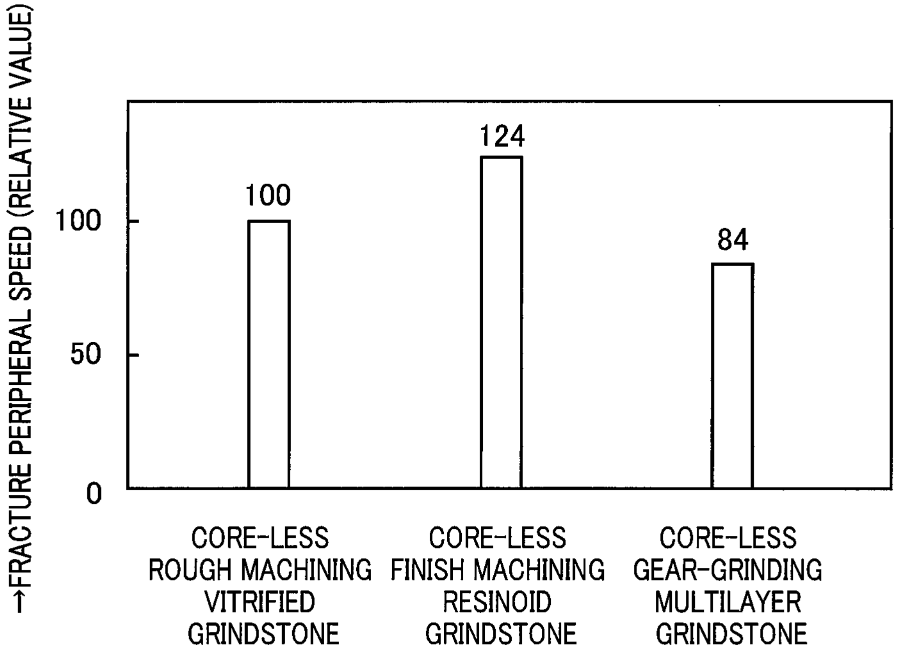
FIG. 7 A view showing a result of a fracture peripheral-speed test of a gear-grinding multilayer grindstone in which a rough machining portion and a finish machining portion are bonded at their respective end surfaces.

FIG. 7 shows relative values where the fracture peripheral speed of the above-described core-less rough machining vitrified grindstone of the single unit is 100, in the result of the fracture peripheral-speed test 1. As shown in FIG. 7, where the fracture peripheral speed of the core-less rough machining vitrified grindstone of the single unit is 100, the fracture peripheral speed of the core-less finish machining resinoid grindstone of the single unit was 124, and the fracture peripheral speed of the core-less gear-grinding multilayer grindstone of the single unit was 84. Thus, the fracture peripheral speed of the core-less gear-grinding multilayer grindstone of the single unit was lower than a lower one of the fracture peripheral speeds of the core-less rough machining vitrified grindstone of the single unit and the core-less finish machining resinoid grindstone of the single unit, by 16%. This indicates that the bonding between the entire end surfaces of the respective core-less rough machining vitrified grindstone and core-less finish machining resinoid grindstone acts in a direction for making the fracture peripheral speed of the core-less gear-grinding multilayer grindstone lower than the fracture peripheral speed of the core-less rough machining vitrified grindstone of the single unit.

(Fracture Peripheral-Speed Test 2)

The fracture peripheral-speed test was conducted in accordance with regulation of JISR6240, for the material 1 in the form of the core-less rough machining vitrified grindstone of the single unit, the material 2 in the form of the core-less finish machining resinoid grindstone of a single unit, a finish machining resinoid grindstone with core including the material 4 (core) and the finish machining resinoid grindstone of the material 2 that is bonded onto an outer circumferential surface of the material 4, and a gear-grinding multilayer grindstone including a rough machining vitrified grindstone with core and a finish machining resinoid grindstone with core, which are fixed at end surfaces of only their cores to each other with use of the adhesive of the material 5.

Figure 8:
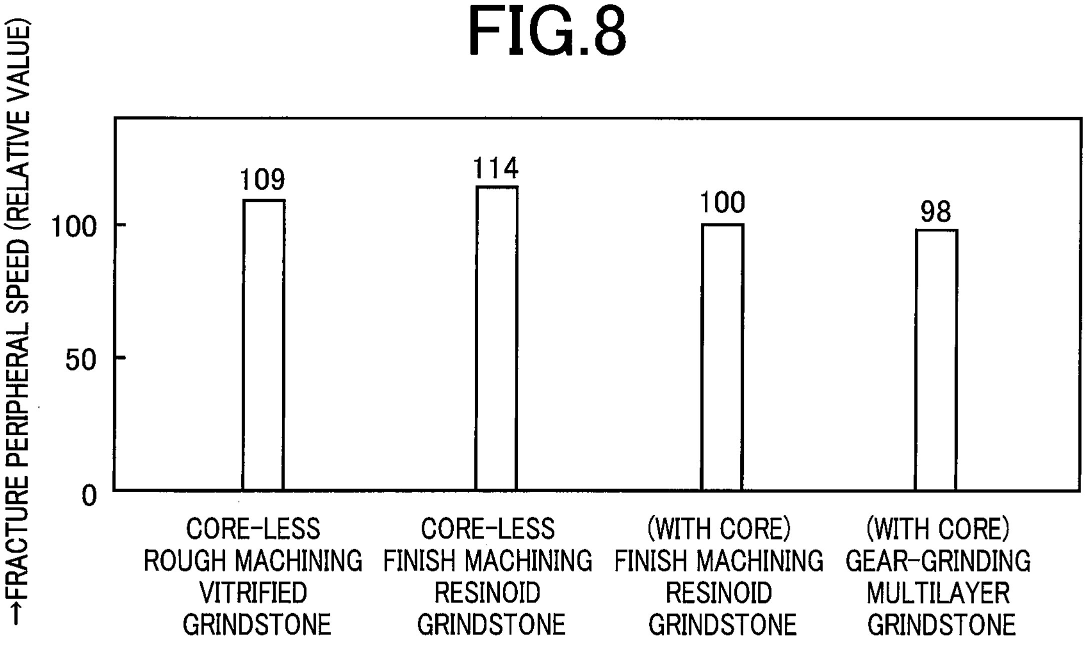
FIG. 8 A view showing a result of a fracture peripheral-speed test of a gear-grinding multilayer grindstone in which the finish machining portion includes a resinoid grindstone, and only a core of the rough machining portion and a core of the finish machining portion are bonded at their respective end surfaces.

FIG. 8 shows relative values where the fracture peripheral speed of the above-described finish machining resinoid grindstone with core is 100, in the result of the fracture peripheral-speed test 2. As shown in FIG. 8, the fracture peripheral speed of the core-less rough machining vitrified grindstone was 109, the fracture peripheral speed of the core-less finish machining resinoid grindstone was 114, and the fracture peripheral speed of the gear-grinding multilayer grindstone was 98. Thus, the fracture peripheral speed of the gear-grinding multilayer grindstone was lower than 100 that is the fracture peripheral speed of the finish machining resinoid grindstone with core, by 2%. That is, the fracture peripheral speed of the gear-grinding multilayer grindstone and the fracture peripheral speed of the finish machining resinoid grindstone with core were substantially the same as each other. This indicates that the bonding between the rough machining vitrified grindstone with core and the finish machining resinoid grindstone with core at the end surfaces of only their cores acts for suppressing reduction of the fracture peripheral speed of the gear-grinding multilayer grindstone.

(Fracture Peripheral-Speed Test 3)

The fracture peripheral-speed test was conducted in accordance with regulation of JISR6240, for the material 1 in the form of the core-less rough machining vitrified grindstone of the single unit, the material 3 in the form of a core-less finish machining abrasive-cloth laminated grindstone, a finish machining abrasive-cloth laminated grindstone with core including the material 4 (core) and the finish machining abrasive-cloth laminated grindstone of the material 3, and the gear-grinding multilayer grindstone including a rough machining vitrified grindstone with core and a finish machining resinoid grindstone with core, which are fixed at end surfaces of only their cores to each other with use of the adhesive of the material 5.

Figure 9:
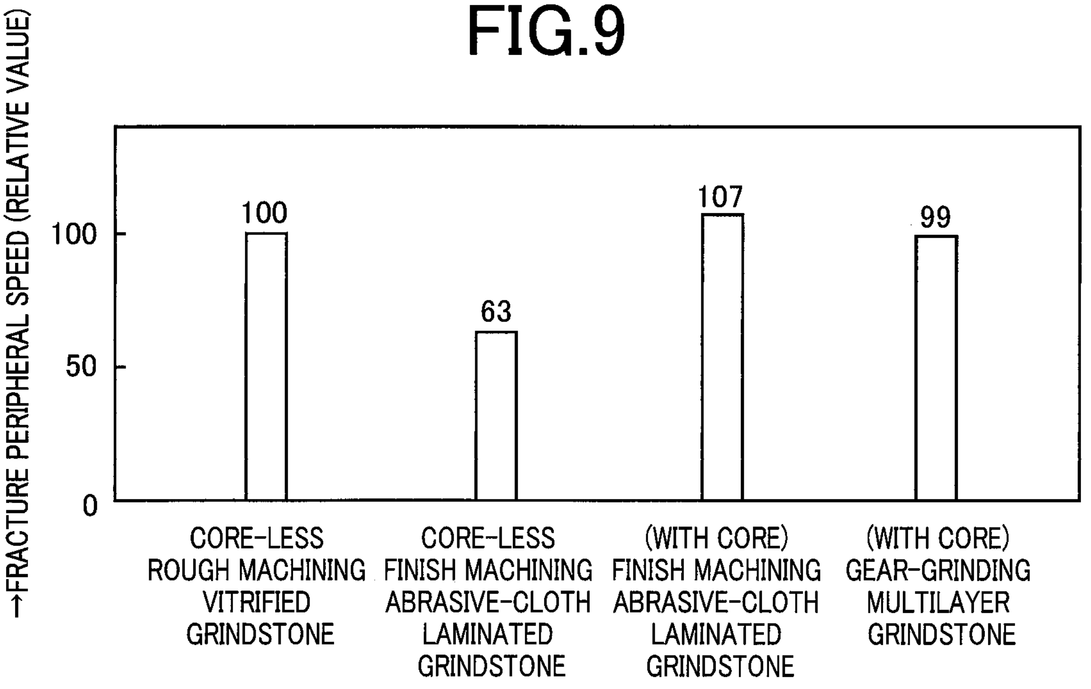
FIG. 9 A view showing a result of a fracture peripheral-speed test of a gear-grinding multilayer grindstone in which the finish machining portion includes a abrasive-cloth laminated grindstone, and only a core of the rough machining portion and a core of the finish machining portion are bonded at their respective end surfaces.

FIG. 9 shows relative values where the fracture peripheral speed of the above-described core-less rough machining vitrified grindstone is 100, in the result of the fracture peripheral-speed test 3. As shown in FIG. 9, the fracture peripheral speed of the core-less finish machining abrasive-cloth laminated grindstone was 63, the fracture peripheral speed of the finish machining abrasive-cloth laminated grindstone with core was 107, and the fracture peripheral speed of the gear-grinding multilayer grindstone was 99. Thus, the fracture peripheral speed of the gear-grinding multilayer grindstone was lower than 100 that is the fracture peripheral speed of the core-less rough machining vitrified grindstone, by 1%. That is, the fracture peripheral speed of the gear-grinding multilayer grindstone and the fracture peripheral speed of the core-less rough machining vitrified grindstone were substantially the same as each other. This indicates that the bonding between the rough machining vitrified grindstone with core and the finish machining resinoid grindstone with core at the end surfaces of only their cores acts for suppressing reduction of the fracture peripheral speed of the gear-grinding multilayer grindstone with core.

As described above, the gear-grinding multilayer grindstone 12 of the present embodiment includes the rough machining portion 52 and the finish machining portion 54 that are fixed to each other on the rotational axis Cy, wherein the rough machining portion 52 includes the first core 52*a* and the rough machining grindstone 52*b* that is fixed on the outer circumferential surface of the first core 52*a*, and the finish machining portion 54 includes the second core 54*a* and the finish machining grindstone 54*b* that is fixed on the outer circumferential surface of the second core 54*a*. The rough machining portion 52 and the finish machining portion 54 are integral with each other, with only the end surfaces of the first and second cores 52*a*, 54*a* being fixed to each other, without the rough machining grindstone 52*b* and the finish machining grindstone 54*b* being fixed at least at outer peripheral portions of their opposed surfaces to each other. Owing to this feature, it is possible to obtain substantially the same level of breaking strength as in the case in which each of the rough machining portion 52 and the finish machining portion 54 is used as a single unit, and to perform a grinding operation with substantially the same rotational speed as in the case in which each of the rough and finish machining portions 52, 54 is used as the single unit, thereby increasing the machining efficiency of gear grinding. Further, the end surfaces of the respective first and second cores 52*a*, 54*a* are fixed to each other, so that thread grooves provided in the respective outer circumferential surfaces of the rough and finish machining grindstones 52*b*, 54*b* of the rough and finish machining portions 52, 54 can be made coincident in phase with each other, thereby making it possible to reduce a time required for the dressing operation and to further increase the grinding efficiency.

Further, in the present embodiment, the rough machining grindstone 52*b* fixed on the outer circumferential surface of the first core 52*a* is the vitrified grindstone in which the abrasive grains are fixed to each other through the inorganic binder, and the finish machining grindstone 54*b* fixed on the outer circumferential surface of the second core 54*a* is the resinoid grindstone in which the abrasive grains are fixed to each other through the resin binder, or the abrasive-cloth laminated grindstone including the abrasive cloths in each of which the abrasive grains are fixed in a plane such that the abrasive cloths are laminated on each other and are fixed to each other through the resin. Owing to this feature, the finish machining grindstone 54*b* of the finish machining portion 54 has a higher elasticity than the rough machining grindstone 52*b* of the rough machining portion 52. Further, in a case in which the finish machining grindstone 54*b* is constituted by the abrasive-cloth laminated grindstone, a centrifugal force generated during the rotation is low owing to a low specific gravity of the finish machining grindstone 54*b*, so that the gear-grinding multilayer grindstone 12 can be used with a higher peripheral speed than where the abrasive-cloth laminated grindstone is used as the single unit.

Further, in the present embodiment, each of the first core 52*a* and the second core 54*a* is constituted by the vitrified grindstone that has a higher strength than the rough machining grindstone 52*b*. Owing to this feature, the first and second cores 52*a*, 54*a* can be easily produced.

Further, in the present embodiment, each of the first core 52*a* and the second core 54*a* is constituted, for example, by the vitrified grindstone that is reinforced with an impregnated resin being cured. Owing to this feature, the gear-grinding multilayer grindstone 12 has an increased durability.

Further, in the present embodiment, the rough machining portion 52 and the finish machining portion 54 are fixed to each other, with only the first core 52*a* and the second core 54*a* being bonded at their end surfaces to each other. Owing to this feature, even if each one of the rough machining grindstone 52*b* and the finish machining grindstone 54*b* is deformed, the other of the rough machining grindstone 52*b* and the finish machining grindstone 54*b* is not affected by the deformed one, so that the peripheral speed can be increased in the grinding operation, with the grinding performance of each of the rough machining grindstone 52*b* and the finish machining grindstone 54*b* being maintained, whereby the grinding efficiency is increased. Further, since a phase deviation between the rough machining grindstone 52*b* and the finish machining grindstone 54*b* can be eliminated, a dressing operation can be performed on the outer circumferential surfaces of the rough machining grindstone 52*b* and the finish machining grindstone 54*b* in a short length of time as a standard dressing operation.

Further, the gear-grinding multilayer grindstone 12 of the present embodiment is to be used in the continuous-generation gear grinding operation that is executed to form teeth in the outer circumferential surface of the gear blank BL, by displacing (shifting) the gear-grinding multilayer grindstone 12 in the direction of the rotational axis while rotating the gear-grinding multilayer grindstone 12 about the rotational axis Cy, and performing the reciprocating grinding feed of the gear-grinding multilayer grindstone 12 in the direction parallel to the rotational axis Cz of the gear blank BL while sequentially rotating the gear blank BL about the rotational axis Cz of the gear blank BL, such that the rotation of the gear blank BL is synchronized with the reciprocating grinding feed of the gear-grinding multilayer grindstone 12. Owing to this feature, the gear blank BL is ground, with contact of the gear blank BL at its large arc length with the gear-grinding multilayer grindstone 12, and with constant change of position in which the abrasive grains are in contact with the gear blank BL, so that the gear grinding is performed with a high efficiency.

Embodiment 2

There will be described other embodiments of this invention. The same reference signs as used in the above-described embodiment will be used in the following embodiments, to identify the practically corresponding elements, and descriptions thereof are not provided.

Figure 10:
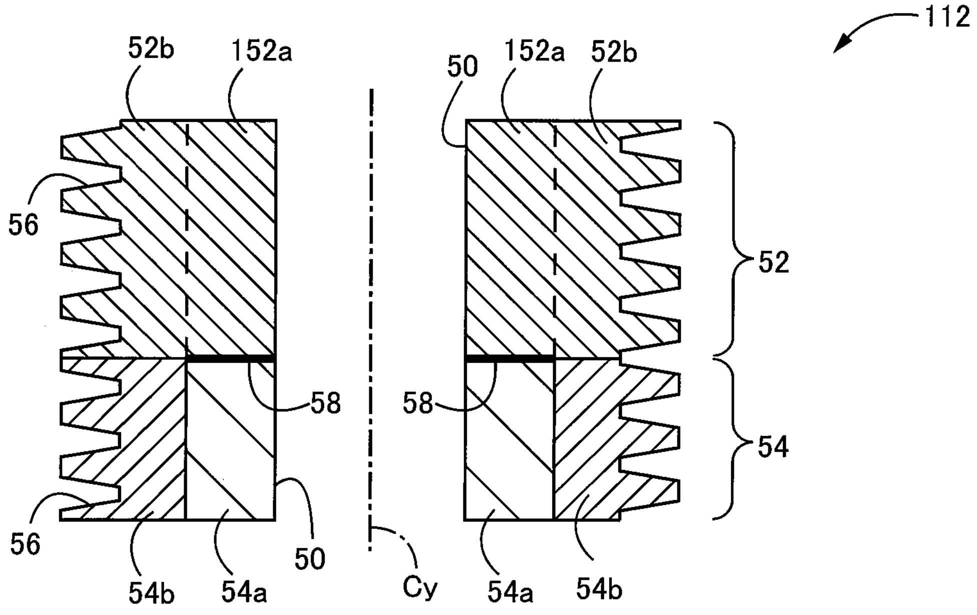
FIG. 10 A cross sectional view, which corresponds to the view of FIG. 6, for explaining construction of a gear-grinding multilayer grindstone according to another embodiment of the present invention.

In a gear-grinding multilayer grindstone 112 of FIG. 10, the rough machining grindstone 52*b* of the rough machining portion 52 is a vitrified grindstone in which abrasive grains are fixed to each other through an inorganic binder, and a first core 152*a* has a vitrified grindstone structure that is a structure same as the vitrified grindstone as the rough machining grindstone 52*b*. The first core 152*a* is constituted integrally with the rough machining grindstone 52*b* (vitrified grindstone), on an inner peripheral side of the rough machining grindstone 52*b* (vitrified grindstone). Owing to this feature, the first core 152*a* has the vitrified grindstone structure that is the structure same as the rough machining grindstone 52*b*, and is constituted integrally with the rough machining grindstone 52*b*, on the inner peripheral side of the rough machining grindstone 52*b*, so that it is not necessary to fix the rough machining grindstone 52*b* onto the outer circumferential surface of the first core 152*a*, and accordingly the manufacturing process is simplified.

Embodiment 3

Figure 11:
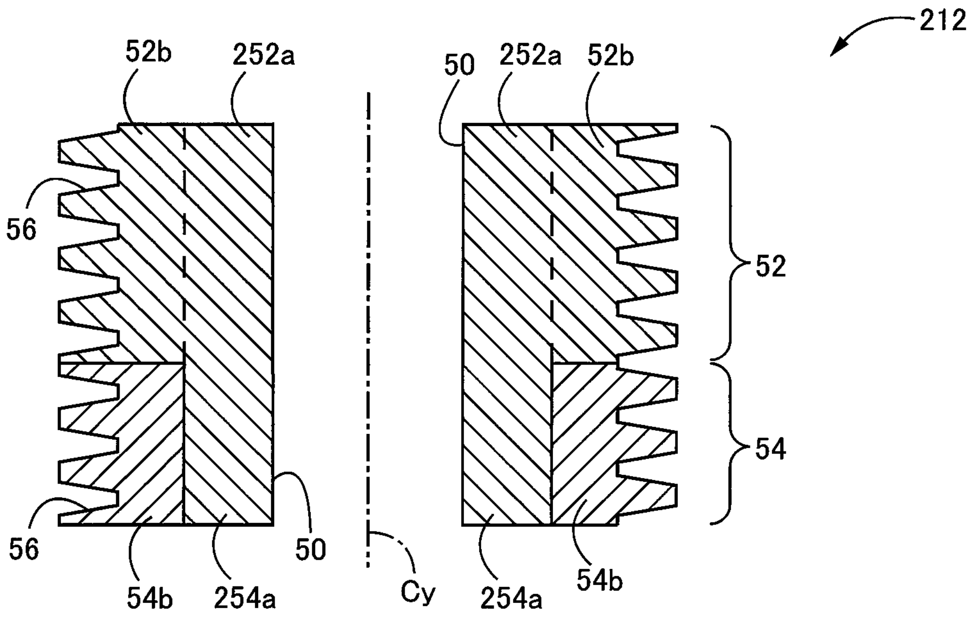
FIG. 11 A cross sectional view, which corresponds to the view of FIG. 6, for explaining construction of a gear-grinding multilayer grindstone according to still another embodiment of the present invention.

In a gear-grinding multilayer grindstone 212 of FIG. 11, the rough machining grindstone 52*b* of the rough machining portion 52 is a vitrified grindstone in which abrasive grains are fixed to each other through an inorganic binder, and a first core 252*a* of the rough machining portion 52 has a vitrified grindstone structure that is a structure same as the vitrified grindstone as the rough machining grindstone 52*b*. The first core 252*a* is constituted integrally with the rough machining grindstone 52*b* (vitrified grindstone), on the inner peripheral side of the rough machining grindstone 52*b* (vitrified grindstone). Further, a second core 254*a* of the finish machining portion 54 has the vitrified grindstone structure that is the structure same as the rough machining grindstone 52*b* (vitrified grindstone), and is constituted integrally with the first core 252*a*, on a side of the first core 252*a* which is close to the finish machining grindstone 54*b* in the direction of the rotational axis Cy, and the finish machining grindstone 54*b* is fixed on the outer circumferential surface of the second core 254*a* through adhesive. Owing to this feature, the first core 252*a* has the vitrified grindstone structure that is the structure same as the rough machining grindstone 52*b* and is constituted integrally with the rough machining grindstone 52*b*, on the inner peripheral side of the rough machining grindstone 52*b*, and the second core 254*a* is constituted integrally with the first core 252*a*, so that it is not necessary to fix the rough machining grindstone 52*b* onto the outer circumferential surface of the first core 52*a* through adhesive, and to fix the first and second cores 252*a*, 254*a* to each other, and accordingly the manufacturing process is simplified.

While the embodiments of the present invention have been described in detail with reference to the drawings, it is to be understood that the invention is not limited to the embodiments but may be embodied also in other forms.

For example, in the gear-grinding multilayer grindstone 12 of the embodiment 1, the rough machining portion 52 and the finish machining portion 54 are fixed to each other, with the end surfaces of only their first and second cores 52*a*, 54*a* being bonded to each other through the adhesive 58. However, in addition to the end surfaces of the first and second cores 52*a*, 54*a*, the rough machining grindstone 52*b* and the finish machining grindstone 54*b* may be fixed at their inner peripheral portions to each other, to an extent that does not reduce the fracture peripheral speed of the gear-grinding multilayer grindstone 12. That is, the rough machining grindstone 52*b* and the finish machining grindstone 54*b* may be fixed to each other, to the extent that does not reduce the fracture peripheral speed of the gear-grinding multilayer grindstone 12, namely, such that the rough machining grindstone 52*b* and the finish machining grindstone 54*b* is not fixed at least at their outer peripheral portions to each other. The same description is applied to the gear-grinding multilayer grindstone 112 of the embodiment 2.

Further, each of the gear-grinding multilayer grindstones 12, 112, 212 of the above-described embodiments is provided with the thread groove 56 in the outer circumferential grinding surface, and is to be used in the continuous-generation gear grinding machine 10 for forming the helical teeth in the gear blank BL. However, the gear-grinding multilayer grindstone 12 may be provided with a plurality of annular grooves, so as to be used in a grinding machine for grinding a spur gear. In this case, too, it is possible to obtain substantially the same level of breaking strength as in the case in which each of the rough machining portion 52 and the finish machining portion 54 is used as the single unit, and to perform an operation for grinding the spur gear, with substantially the same rotational speed as in the case in which each of the rough and finish machining portions 52, 54 is used as the single unit, thereby increasing the machining efficiency of gear grinding.

It is to be understood that what have been described above are merely the embodiments of the present invention, and that the present invention may be embodied with various changes and modifications in a range without departing from the spirit of the invention.

DESCRIPTION OF REFERENCE SIGNS

12, 112, 212: gear-grinding multilayer grindstone 52: rough machining portion 52*a*, 152*a*, 252*a*: first core 52*b*: rough machining grindstone 54: finish machining portion 54*a*, 254*a*: second core 54*b*: finish machining grindstone BL: gear blank Cy: rotational axis of gear-grinding multilayer grindstone Cz: rotational axis of gear blank

The invention claimed is:

1. A multilayer grindstone for gear grinding, the multilayer grindstone comprising:

a rough machining portion and a finish machining portion that are disposed adjacent to each other on a rotational axis, wherein the rough machining portion includes a first core and a rough machining grindstone that is held on the first core, wherein the finish machining portion includes a second core that is adjacent to the first core, and a finish machining grindstone that is held on the second core; and wherein the rough machining portion and the finish machining portion are fixed to each other, with only the first core and the second core being bonded at end surfaces thereof to each other, without the rough machining grindstone and the finish machining grindstone being bonded to each other.

2. The multilayer grindstone according to claim 1, wherein the rough machining grindstone is a vitrified grindstone in which abrasive grains are fixed to each other through an inorganic binder, and wherein the finish machining grindstone is a resinoid grindstone in which abrasive grains are fixed to each other through a resin binder.

3. The multilayer grindstone according to claim 1, wherein the rough machining grindstone is a vitrified grindstone in which abrasive grains are fixed to each other through an inorganic binder, and wherein the finish machining grindstone is an abrasive-cloth laminated grindstone including abrasive cloths in each of which abrasive grains are fixed in a plane, such that the abrasive cloths are laminated on each other and are fixed to each other through a resin.

4. The multilayer grindstone according to claim 1, wherein each of the first core and the second core is constituted by a vitrified grindstone.

5. The multilayer grindstone according to claim 4, wherein each of the first core and the second core is constituted by the vitrified grindstone that is reinforced with an impregnated resin being cured.

6. The multilayer grindstone according to claim 1, wherein the multilayer grindstone is to be used in a continuous-generation gear grinding operation that is executed to form teeth in an outer circumferential surface of a gear blank, by displacing the multilayer grindstone in a direction of the rotational axis while rotating the multilayer grindstone about the rotational axis, and performing reciprocating grinding feed of the multilayer grindstone in a direction parallel to a rotational axis of the gear blank while sequentially rotating the gear blank about the rotational axis of the gear blank, such that rotation of the gear blank is synchronized with the reciprocating grinding feed of the multilayer grindstone.

7. The multilayer grindstone according to claim 1, wherein the rough machining grindstone is a vitrified grindstone in which abrasive grains are fixed to each other through an inorganic binder, and wherein the first core has a vitrified grindstone structure that is a structure same as the vitrified grindstone, and is constituted integrally with the vitrified grindstone, on an inner peripheral side of the vitrified grindstone.

8. The multilayer grindstone according to claim 1, wherein the rough machining grindstone is a vitrified grindstone in which abrasive grains are fixed to each other through an inorganic binder, wherein the first core has a vitrified grindstone structure that is a structure same as the vitrified grindstone, and is constituted integrally with the vitrified grindstone, on an inner peripheral side of the vitrified grindstone, wherein the second core has the vitrified grindstone structure that is the structure same as the vitrified grindstone, and is constituted integrally with the first core, on a side of the first core which is close to the finish machining grindstone, and wherein the finish machining grindstone is fixed on an outer circumferential surface of the second core.

* * * * *